United States Patent [19]

Yamada et al.

[11] Patent Number: 4,722,312

[45] Date of Patent: Feb. 2, 1988

[54] ELECTRO-PRESSURE CONVERSION CONTROL DEVICE

[75] Inventors: Masatoshi Yamada; Masanobu Kimura; Makoto Koike; Kiyomi Kawamura, all of Aichi, Japan

[73] Assignee: Kabushiki Kaisha Toyota Chuo Kenkyusho, Aichi, Japan

[21] Appl. No.: 894,893

[22] Filed: Aug. 8, 1986

[30] Foreign Application Priority Data

Aug. 12, 1985 [JP] Japan .................................. 60-177361
Dec. 6, 1985 [JP] Japan .................................. 60-275764

[51] Int. Cl.$^4$ ...................... F02M 39/00; G05D 16/00
[52] U.S. Cl. ......................................... 123/458; 137/82; 123/459; 251/30.01
[58] Field of Search ............................. 137/82, 83, 84; 251/129.08, 30; 123/458, 459; 239/533.4, 533.3, 584, 585

[56] References Cited

U.S. PATENT DOCUMENTS

| | | | |
|---|---|---|---|
| 2,729,751 | 1/1956 | Westman | 137/82 |
| 2,813,519 | 11/1957 | Persson | 137/82 |
| 3,063,422 | 11/1962 | Gregowski | 137/82 X |
| 4,327,864 | 5/1982 | Gupta | 137/82 X |
| 4,566,416 | 1/1986 | Berchtold | 123/458 |
| 4,610,263 | 9/1986 | Barnes | 137/82 X |

Primary Examiner—Alan Cohan
Attorney, Agent, or Firm—Berman, Aisenberg & Platt

[57] ABSTRACT

An electro-pressure conversion control device comprising a fluid passage formed in a device body, which fluid passage includes a fluid inlet at one end, a throttle, a jetting hole at the other end, and a control pressure taking port provided between said throttle and said jetting hole and a plate which is driven by an electrical actuator in such a manner as to go across the axis of the jetting hole thereby to open and close the jetting hole whereby the jetting hole operates as a variable throttle. The plate is displaced in a direction perpendicular to the axis of the jetting hole by the electrical actuator to control the degree of opening of the jetting hole thereby to control the pressure in the fluid passage between the throttle and the jetting point so as to provide a pressure which varies according to an electrical signal applied to the electrical actuator.

2 Claims, 13 Drawing Figures

ELECTRO-PRESSURE CONVERSION CONTROL DEVICE

BACKGROUND OF THE INVENTION

This invention relates to an electro-pressure conversion control device in which a plate is driven by an electrical actuator to open and close the jetting hole, through which fluid flows, thereby to control the fluid pressure, and to such an electro-pressure conversion control device which is combined with a fuel injection valve device in which the needle valve is operated by a predetermined fuel pressure to inject fuel from the fuel injection hole.

There has been a strong demand for electrical control fluid because of the recent development of electronic technique, and it has been requested to improve the response characteristic of an electro-pressure conversion control device.

The electro-pressure conversion control device comprises, in combination, an electro-mechanical converter (hereinafter referred to as "an electrical actuator" when applicable) for converting an electrical signal into a mechanical drive force, and a pressure control valve for controlling the pressure of fluid.

It is true that the response characteristics of the electro-pressure conversion control device is determined by the response characteristic of the electrical actuator.

Heretofore, research has been conducted mainly to improve the response characteristic of the electrical actuator; however, it has been difficult to provide a suitable electrical actuator.

In general, the performance of an electrical actuator for fluid control is evaluated in (1) generated drive force, (2) drive displacement, and (3) response characteristic. Generally, the items (1) and (3) or (2) and (3) are contradictory to each other. If the response characteristic is increased, then the drive force and the displacement are decreased. Stated differently, if the drive force and the drive displacement are sacrificed to same extent, the actuator may have a high responsibility.

However, a conventional pressure control valve requires the drive force and the displacement which are relatively large, and therefore it is rather difficult to improve the response characteristic of the electrical actuator. Accordingly, it has been impossible for the prior art to provide an electro-pressure conversion control device high in response characteristic.

On the other hand, recently electrical control of a fuel injection device has been developed to improve the combustion efficiency of an automotive engine or the like thereby to economically use fuel, to purify exhaust gas, and to decrease noise.

A variety of electrical control methods for fuel injection valves have been proposed, and various fuel injection valves have been proposed, and some of them have been put in practical use.

One example of the conventional fuel injection have control methods is as shown in FIG. 1, which is extensively employed for a gasoline fuel injection. In the method, the needle valve 15 of a fuel injection valve A is driven directly by an electrical actuator 16 to control the fuel injection. The fuel injection device shown in FIG. 1 is advantageous in that it is simple in construction and can be readily controlled; however, it is disadvantageous in that, in order to provide a high injection pressure, it is necessary to drive the needle valve 15 with a large drive force, and accordingly in this case it is necessary to use an electrical actuator 16 large in capacity; that is it is necessary to use a heavy electrical actuator 16, with the result that the response characteristic is lowered. Therefore, the injection control method is not practical for the high pressure fuel injection in which the injection pressure is over 10 kg/cm$^2$.

An electrical control system in which, as shown in FIG. 2, an electromagnetic valve is used to control an accumulator injection valve B has been proposed in the art. The system permits a high-pressure fuel injection. However, the system is disadvantageous in that, as it is necessary to provide an accumulator 17 or a pressure intensifying piston 18 and pipes therefor, the injection valve is rather intricate in construction, and the response characteristic is not sufficient in practical use.

Thus, it is difficult for the prior art to provide an electrical control type fuel injection device simple in construction, high in injection pressure and excellent in control characteristic.

OBJECTS AND SUMMARY OF THE INVENTION

An object of this invention is to eliminate the above-described difficulties. More specifically, an object of the invention is to provide an electro-pressure conversion control device having a high response characteristic in which, in order to use a high-response electrical actuator such as a piezo-electric bimorph element, a piezo-electric layer-built element, a solenoid or an electromagnet whose response characteristic is improved with small driving displacement and power.

Another object of the invention is to provide an electro-pressure conversion control device which permits a high-pressure fuel injection, and is excellent both in control characteristic and in response characteristic.

According to the invention, there is provided an electro-pressure conversion control device comprising; a fluid passage formed in a device body, said fluid passage including a fluid inlet at one end, a throttle, a jetting hole at the other end, and a control pressure taking port provided between said throttle and said jetting hole; and a plate which is driven by an electrical actuator in such a manner as to go across the axis of said jetting hole thereby to open an close said jetting hole whereby said jetting hole operates as a variable throttle, said plate being displaced in a direction perpendicular to the axis of said jetting hole by said electrical actuator to control the degree of opening of said jetting hole thereby to control the pressure in the fluid passage between said throttle and said jetting point so as to provide a pressure which varies according to an electrical signal applied to said electrical actuator.

DETAILED DESCRIPTION OF THE PREFERRED EMBODIMENTS

Figure 1:
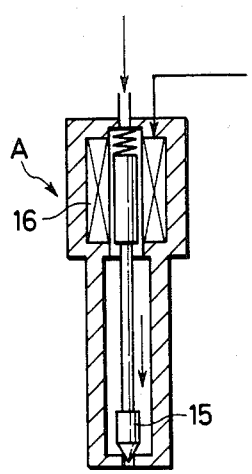
FIGS. 1 and 2 are explanatory diagrams showing examples of a conventional electro-pressure conversion control device.
Figure 2:
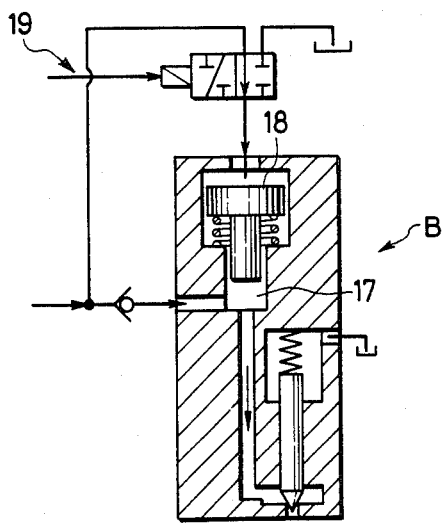
Figure 3:
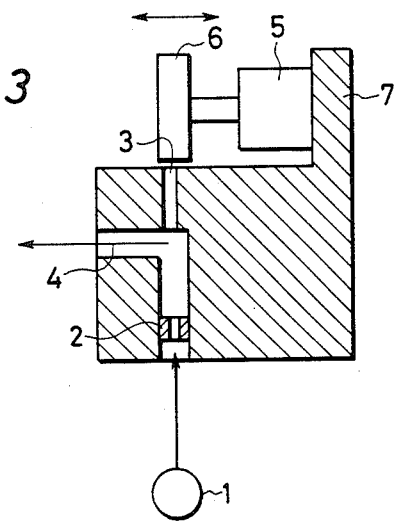
FIGS. 3 and 4 are explanatory diagrams showing the fundamental arrangement of an electro-pressure conversion control device according to the invention.
Figure 4:
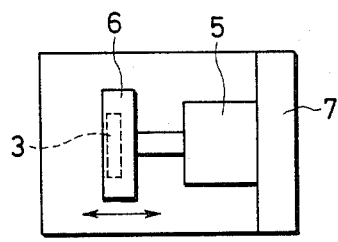

The principle of operation of the electro-pressure conversion control device according to the invention will be described with reference to FIGS. 3 and 4.

The device of the invention comprises: a fluid passage formed in the device body, the fluid passage including a fluid inlet at one end, a throttle, a jetting hole at the other end, and a control pressure taking port provided between the throttle and the jetting hole; and a plate which is driven by an electrical actuator in such a manner as to go across the axis of the jetting hole to open and close the jetting hole. In other words, the device of the invention comprises; a fluid passage section including a fluid passage extended from a pressure supplying source 1 through a throttle 2 to a jetting hole 3 and a flow path 4 provided between the throttle 2 and the jetting hole 3 in order to take the control pressure; and a plate drive section in which a plate 6 attached to the drive section of an electrical actuator 5 secured to a stationary member 7 is displaced in a manner as to go across the axis of the jetting hole to thereby open and close the jetting hole.

In the electro-pressure conversion control device of the invention, the plate 6 is driven by the electrical actuator so that it is displaced according to an electrical input signal.

The plate 6 is caused to go across the axis of the jetting hole 3 to change the degree of opening of the latter 3. That is, as the plate 6 is displaced, the degree of opening of the jetting hole 3 is varied. Thus, the jetting hole 3 acts as a variable throttle operated continuously according to an electrical control signal applied to the device.

When the overlapping area of the jetting hole 3 and the plate 6 is large; i.e., the opening degree of the jetting hole 3 is small, the throttling effect of the fluid outlet is large, and therefore the pressure in the fluid passage between the throttle 2 and the jetting hole 3 is increased.

When, in contrast, the overlapping area of the jetting hole 3 and the plate 6 is small, the throttling effect of the fluid outlet is small, and the pressure in the fluid passage is decreased.

When the jetting hole 3 is completely covered by the plate 6, the pressure is maximum. When the plate 6 is moved away from the jetting hole 3, the pressure is minimum. Thus, the control pressure which varies continuously between the maximum value and the minimum value according to electrical input signals applied to the device can be obtained through the flow path 4.

The device of the invention provides the following effects or merits:

(1) As the plate 6 is displaced to shear the flow of fluid discharged through the jetting hole 3, the force formed by the flow of fluid (hereinafter referred to as "a fluid force", when applicable) does not act on the plate 6 in the direction of displacement. Therefore, the plate 6 can be driven by a small drive force.

(2) The surface of the plate 6 on which the fluid force acts is different from the surface on which the electrical actuator acts. Therefore, the surface to which the fluid force is applied is increased in rigidity, so as to be free from the effect of the fluid force, and the surface on which the electrical actuator acts is decreased in rigidity so that the drive force of the electrical actuator is sufficiently applied to the plate. Thus, the plate can be designed in agreement with the characteristic of the electrical actuator.

Figure 5:
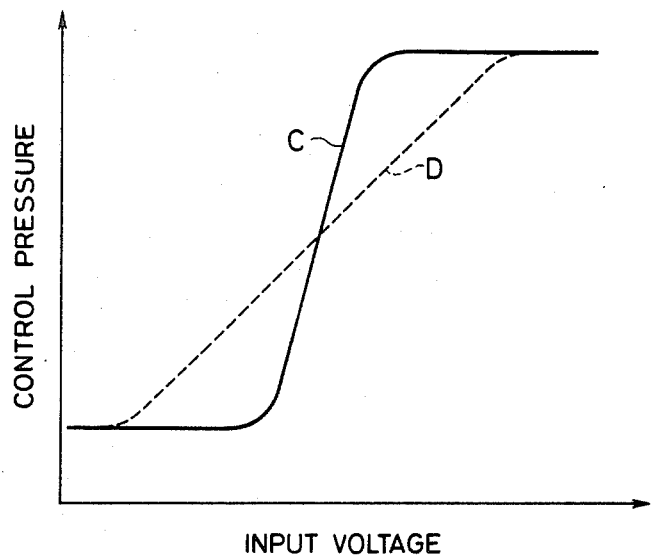
FIGS. 5 through 7 are diagrams for a description of the relationships between jetting hole configurations and control pressures.
Figure 6:
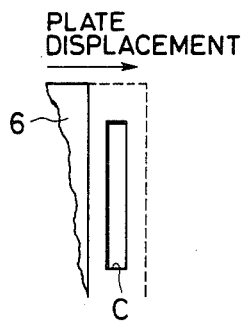
Figure 7:
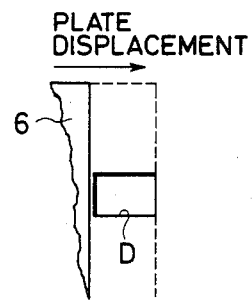

(3) The characteristic of the control pressure with respect to the input voltage (or current) can be freely determined by selecting the configuration of the jetting hole, as shown in FIGS. 5, 6 and 7. For instance, in the case of a digital control, it is necessary to use an electro-pressure conversion control device which can perform an on-off operation at high speed. According to the invention, the configuration of the jetting hole is as shown in FIG. 6. That is, the jetting hole is short in the direction of displacement of the plate, and long in the longitudinal direction of the plate. Therefore, the degree of opening of the jetting hole 3 is greatly changed by small displacement of the plate, which provides the control pressure characteristic in which, as indicated by "Jetting Hole C" in FIG. 5, the low pressure is quickly changed to the high pressure. Therefore, the control characteristic can be readily provided in correspondence to the on-off control.

On the other hand, the jetting hole may be formed in such a manner that it is long in the direction of displacement of the plate as indicated by "Jetting Hole D" in FIG. 7. In this case, the range of control pressure proportional to the displacement of the plate is increased, and the characteristic becomes suitable for linear control.

Heretofore, in order to obtain the characteristic corresponding to the on-off control, for instance in order to obtain the large variation of control pressure with small displacement of a flapper, it is necessary to increase the area of the jetting hole. Therefore, the force of the fluid jetted through the jetting hole is increased, and accordingly it is necessary to increase the drive force of the electrical actuator. Thus, it is rather difficult to freely determine the characteristic.

In the invention, variation of the control pressure characteristic does not affect the plate drive force at all, and the control pressure characteristic can be freely determined without changing the performance of the electrical actuator.

Figure 8:
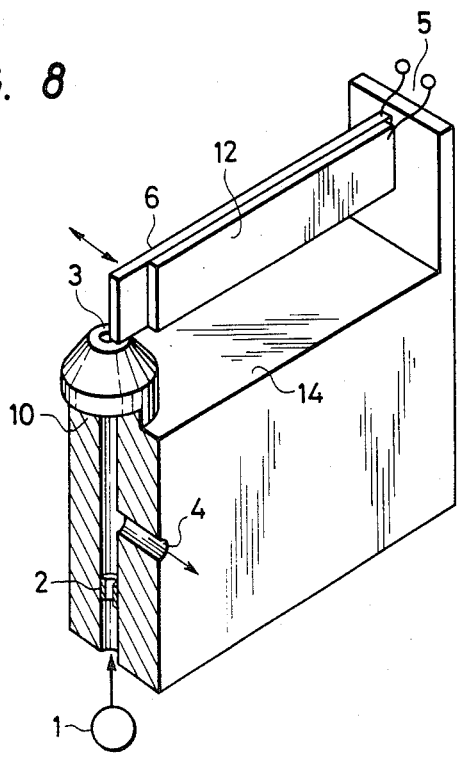
FIG. 8 is an explanatory diagram showing the arrangement of a first embodiment of the invention.

FIG. 8 shows an electro-pressure conversion control device, which is a first embodiment of this invention. In the device, fluid supplied under a predetermined pressure with the aid of a pressure supply source 1 is passed through a fluid throttle 2 and jetted through the jetting hole 3 of a nozzle 10.

The device has a base 14 in which a fluid passage is formed. The pressure in the passage between the throttle 2 and the nozzle 10 is outputted as a control pressure through the outlet 4 formed in the base.

A plate 6 to which a piezo-electric ceramic bimorph element 12 is attached is secured to the upper portion of the base 14 in such a manner that the outer end of the plate 6 is located above the jetting hole 3 and the clearance between the plate 6 and the jetting hole 3 is as small as possible.

The fluid jetted through the jetting hole 3 is released into drain.

The electro-pressure conversion control device described above operates as follows:

When a fluid is supplied under a certain pressure, the fluid is continuously jetted through the jetting hole 3 of the nozzle 10.

In the case where a negative voltage is applied to the piezo-electric ceramic bimorph element 12, the end portion of the plate 6 is so held as to open the jetting hole 3, and therefore the fluid is allowed to flow with low resistance and the control pressure is low. As the voltage applied to the piezo-electric ceramic bimorph element 12 is increased towards the positive value, the element 12 is curved and accordingly the plate 6 is also curved, so that the end portion of the plate is displaced. As the end portion of the plate 6 is displaced in this manner, the end portion is placed on the jetting hole 3 so that the opening area of the jetting hole 3 is decreased to increase the resistance against the flow of fluid, and the control pressure is increased. As the plate 6 is further displaced, the jetting hole 3 is closed by the end portion of the plate 6, so that the control pressure becomes equal to the supply pressure. However, in practice, there is a clearance between the jetting hole 3 and the end portion of the plate 6, and therefore the pressure is somewhat decreased.

In the first embodiment, with a supply pressure of 70 kg/cm$^2$, the control pressure obtained was in a wide range of from 10 kg/cm$^2$ to 65 kg/cm$^2$. Furthermore, when a pulse input voltage was applied, the device showed an excellent responsing characteristic, responding in 1 msec.

Figure 9:
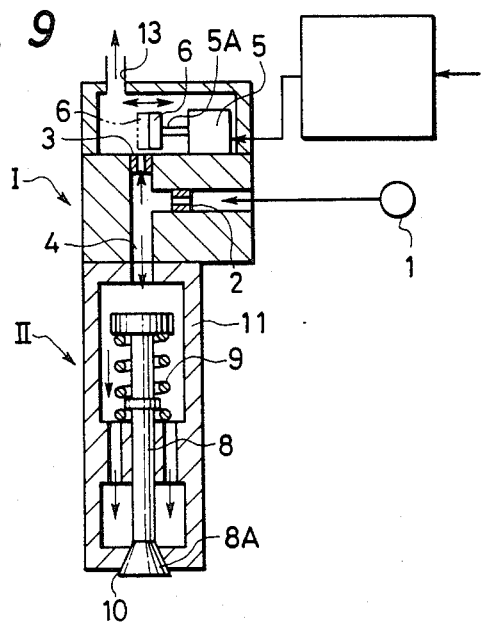
FIG. 9 is an explanatory diagram showing the arrangement of a second embodiment of the invention.

A second embodiment of the invention, as shown in FIG. 9, includes an electro-pressure conversion control device I comprising; a fuel passage extended from a fuel supply source 1 through a throttle 2 to a jetting hole 3; a fuel passage 4 having a flow path to take a control pressure between the throttle 2 and the jetting hole 3; and a plate drive section including a plate 6 secured to the drive section of an electrical actuator 5 which is secured to a stationary valve unit 11, the plate 6 being displaced in such a manner as to go across the axis of the jetting hole 3 thereby to control the opening degree of the jetting hole 3. The valve unit 11 has a needle valve 8 with a valve seat 8A which is pushed by a spring 9 in such a manner that the valve seat 8A opens and closes the jetting hole 10 of the valve unit 11. When a force acting on the needle valve 8 with the aid of the pressure in the fuel passage 4 becomes larger than the elastic force of the spring 9, the needle valve is operated; that is, a fuel injection valve device II is caused to jet the fuel.

The fuel supply source 1 supplies fuel under high pressure. When no electrical signal is applied to the electrical actuator, the plate 6 is held to open the jetting hole 3, and the fuel passed through the throttle 2 is returned, under atmospheric pressure, through a returning fuel passage 13 to the fuel supply source. Therefore, the pressure in the fuel passage 4 is low and the fuel injection valve device II is not operated.

When the electrical signal is applied to the electrical actuator 5, the latter 5 drives the plate 6 so as to close the jetting hole 3. Therefore, the throttling effect of the jetting hole 3 is increased, and the pressure in the fuel passage 4 is also increased. When the fuel pressure becomes larger than the injection valve opening pressure, the needle valve 8 is operated to open the jetting hole of the injection valve; that is, the fuel injection is started. This fuel injection is continued until the application of the electrical signal is suspended. That is, the fuel injection is controlled by the electrical signal.

Effects or merits of the above-described second embodiment of the invention are as follows:

As is apparent from the above description, the electro-pressure conversion control device is simple in construction.

The fuel pressure and the drive force of the electrical actuator 5 are not related to each other, and therefore the injection pressure can be increased without using a large electrical actuator.

The electro-pressure control device, one of the components of the second embodiment, operates quickly in response to the electrical signal, and therefore it can permit a fuel injection of short period. Furthermore, with the device, the fuel injection is continued until the application of the electrical signal is suspended, and therefore a fuel injection of long period can be achieved. Thus, the fuel injection can be controlled in a wide range by the second embodiment.

Thus, the injection period and the injection timing can be freely determined. In addition, the second embodiment of the invention is applicable to an engine in which fuel is jetted into the cylinders; that is, it can be effectively used for vehicle engines.

Figure 10:
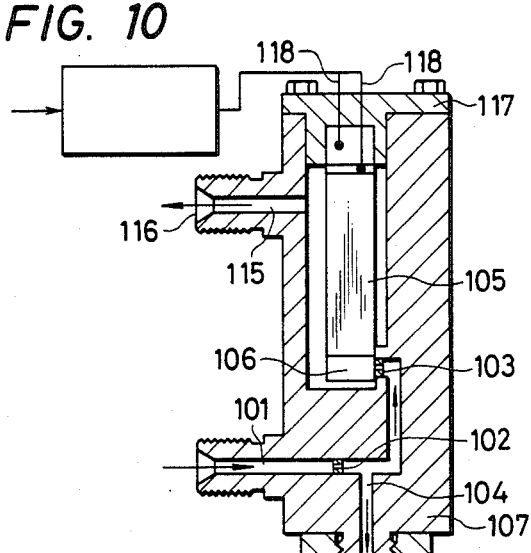
FIGS. 10, 11 and 12 are explanatory diagrams outlining the arrangement of a third embodiment of the invention.
Figure 11:
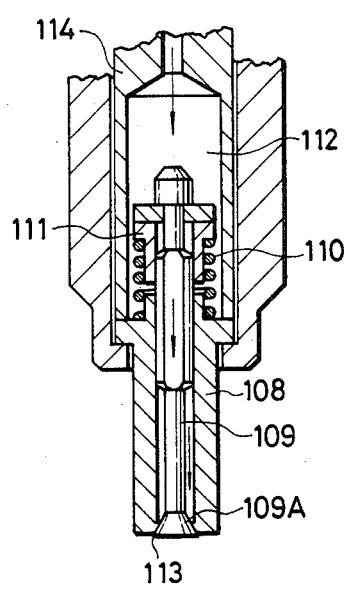
Figure 12:
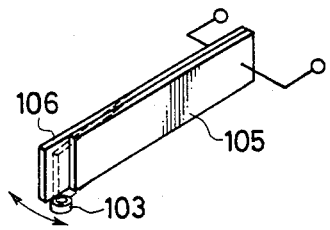

A third embodiment of the invention will be described with reference to FIGS. 10, 11 and 12. FIG. 10 shows the entire arrangement of the third embodiment of the invention, FIG. 11 is a diagram showing an injection valve in detail, and FIG. 3 is a diagram indicating the relationship between a jetting hole and a plate (described later).

The third embodiment of the invention provides an electric control type fuel injection device having, in combination, an electrical fuel pressure control device using a piezo-electric ceramic bimorph element as an electrical actuator and an outward open type automatic injection valve.

The construction of the electric control type fuel injection device is as follows:

The device, as shown in FIG. 10, has a base block 107 in which a fuel passage 104 is formed. The fuel passage 104 includes a fuel supplying inlet 101, a throttle 102, a jetting hole 103, a flow path to take a fuel pressure which is controlled between the throttle 102 and the jetting hole 103.

On the other hand, a plate 106 to which the electrical actuator, namely, the piezo-electric ceramic bimorph element 105 is attached is secured to the base block 107 in such a manner that, upon application of a voltage, the end portion of the plate is displaced to open and close the jetting hole 103.

The injection valve comprises; a valve body 108; and a needle valve 109 which is supported by the valve body 108 and pulled inwardly by a spring 110 so that the valve seat 109A of the needle valve 109 closes the injection hole 113 of the injection valve. The injection valve is secured through a holder 114 to the base block 107. The fuel passage 104 is communicated with an injection valve pressure chamber 112 formed in the holder 114.

In the device according to the third embodiment of the invention, fuel is supplied, under a predetermined high pressure, to the fuel supplying inlet 101. When no voltage is applied to the piezo-electric ceramic bimorph element 105, the end portion of the plate 106 opens the jetting hole 103. Therefore, the throttling effect of the jetting hole 3 is low, and the fuel passed through the jetting hole remains low in pressure. The pressure of the fuel is lower than the injection valve opening pressure, so that the injection valve is not operated. When a signal is applied to a voltage generator to apply a voltage to the piezo-electric ceramic bimorph element 105, the end portion of the plate 106 is displaced so as to close the jetting hole 103. Therefore, the throttling effect of the jetting hole 103 is increased, and therefore the pressure in the fuel passage 104 and accordingly the pressure in the pressure chamber 112 is increased. When the pressure becomes higher than the injection valve opening pressure, the needle valve 109 is operated to open the injection hole 113; that is, the fuel injection is started. The fuel injection is continued until the application of the input voltage is suspended. Upon removal of the input voltage, the pressure in the flow path is decreased. When the pressure becomes lower than the injection valve opening pressure, the fuel injection is stopped.

Figure 13:
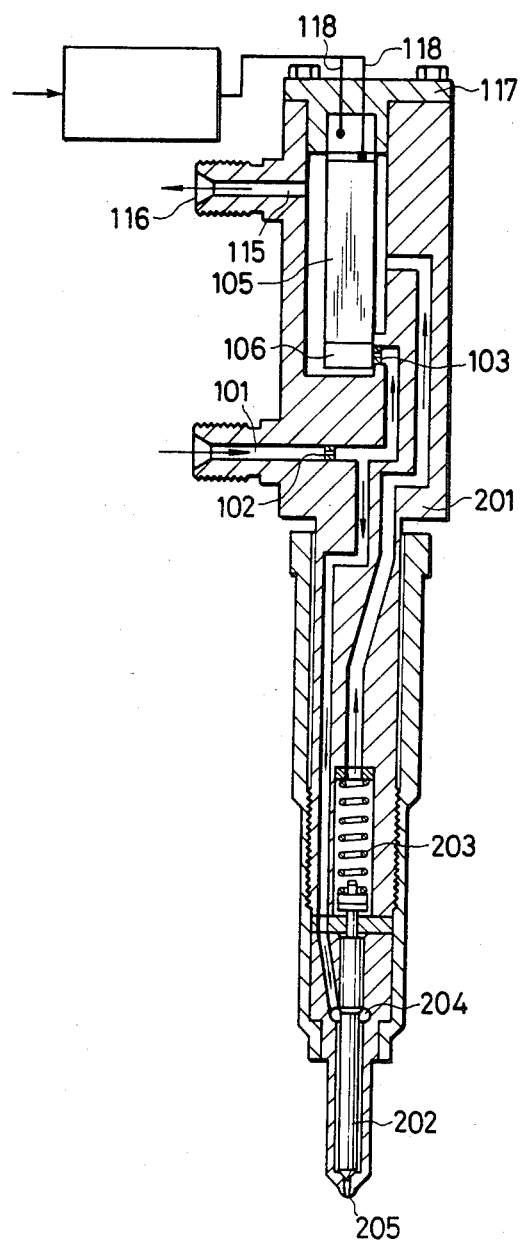
FIG. 13 is an explanatory diagram outlining the arrangement of a fourth embodiment of the invention.

A fourth embodiment of the invention is as shown in FIG. 13. That is, the fourth embodiment provides an electro-pressure conversion control injection device comprising: an electro-pressure conversion control device 201 similar to that described above; and an inward open type automatic fuel injection valve in which, when the fuel pressure applied to a pressure chamber becomes higher than the valve opening pressure, a needle valve 202 is pushed upwardly to open the jetting hole 205 to start the fuel injection. The effects of the fourth embodiment are substantially equal to those of the third embodiment.

The third and fourth embodiments of the invention provide the following effects or merits;

According to the invention, since the electro-pressure conversion control device is made up of the automatic fuel injection valve and the electro-pressure conversion control device, the electro-pressure conversion control device permitting a high-pressure fuel injection is simple in construction.

In the electro-pressure conversion control device, the piezo-electric ceramic bimorph element is employed as the electrical actuator. Therefore, the device can perform the pressure control quickly in response to the control signal. Thus, the electro-pressure conversion control device wide in control range can be provided according to the invention.

As is apparent from the above description, provided by the invention is the electro-pressure conversion control device in which the piezo-electric ceramic bimorph element small both in displacement and in drive force and accordingly high in response is electrically driven to open and close the jetting hole thereby to control the pressure. The structure of the device according to the invention is such that the jetting hole is scarcely affected by the fluid force thereby to improve the response characteristic and to prevent the self-excited vibration. Therefore, the device can achieve the on-off control at high speed, and can be effectively used as a control actuator for each cycle of an engine.

What is claimed is:

1. An electro-pressure conversion control device comprising: a fluid passage formed in a device body, said fluid passage including a fluid inlet at one end, a throttle, a jetting hole at the other end, and a control pressure taking port provided between said throttle and said jetting hole; and a plate having two ends and a length extending from a fulcrum at its one end to its other end which extends over the jetting hole, said one end being connected to the device body, said plate being disposed with its length in a direction perpendicular to a longitudinal axis of said jetting hole so that said other end of said plate is adjacent to said jetting hole, said plate being driven by an electrical actuator in such a manner as to pass across the longitudinal axis of said jetting hole thereby opening an closing said jetting hole, whereby said jetting hole operates as a variable throttle, said plate being displaced in a direction perpendicular to the axis of said jetting hole and substantially perpendicular to the direction of disposition of the length of the plate as it moves by operation of said electrical actuator, with said one end of said plate as a fulcrum to control the degree of opening of said jetting hole, said electrical actuator being a piezo-electric ceramic bimorph element, the pressure in the fluid passage between said throttle and said jetting hole varying according to an electrical signal applied to said electrical actuator.

2. A device as claimed in claim 1, which is combined with a fuel injection valve device which is communicated with said fluid passage and in which a needle valve is operated by a predetermined fuel pressure to inject fuel through an injection hole, and in which said electrical signal applied to said electro-pressure conversion control device is utilized to control the fuel pressure applied to said fuel injection valve device thereby to control the fuel injection thereof.

* * * * *